United States Patent [19]

Walkowiak

[11] 4,159,515
[45] Jun. 26, 1979

[54] INVERTER CONTROL SYSTEM

[76] Inventor: Paul S. Walkowiak, 452 Poplar Ct., Elgin, Ill. 60120

[21] Appl. No.: 887,493

[22] Filed: Mar. 17, 1978

[51] Int. Cl.$^2$ .................... H02M 1/18; H02M 7/515; H02M 7/537

[52] U.S. Cl. ........................................ 363/55; 363/49; 363/56; 363/96; 363/97

[58] Field of Search ................................. 363/22–25, 363/27, 28, 41, 49, 55–57, 96, 97, 131–135, 139

[56] References Cited

U.S. PATENT DOCUMENTS

| | | | |
|---|---|---|---|
| 3,609,507 | 9/1971 | Beck | 363/41 |
| 3,657,631 | 4/1972 | Martens et al. | 363/26 |
| 3,821,632 | 6/1974 | Rylicki | 363/96 |
| 3,859,586 | 1/1975 | Wadlington | 363/56 |

Primary Examiner—William M. Shoop
Attorney, Agent, or Firm—Mason, Kolehmainen, Rathburn & Wyss

[57] ABSTRACT

A control system is provided for the accurately timed control of switching inverter circuitry; for example, an inverter that produces a 115VAC/60HZ output from a 12 V DC source such as a vehicle battery. The control system utilizes an internal reference source and supervisory control circuitry to determine accurate and orderly start up, shut down, control of the inverter switching elements and automatic shut down upon the occurrence of predetermined sensed conditions including low input voltage from the source and excessive output current through the load. The switching elements of the inverter are each controlled to produce respective outputs of predetermined active/inactive duty cycles each switching cycle with an accurate inactive period being established between the active periods of each switching element. Thus, induced transients due to inductive loads and the like are allowed to decay to safe levels prior to the switching transistion between switching elements to reduce undesirable effects on the inverter circuitry and the switching elements.

15 Claims, 5 Drawing Figures

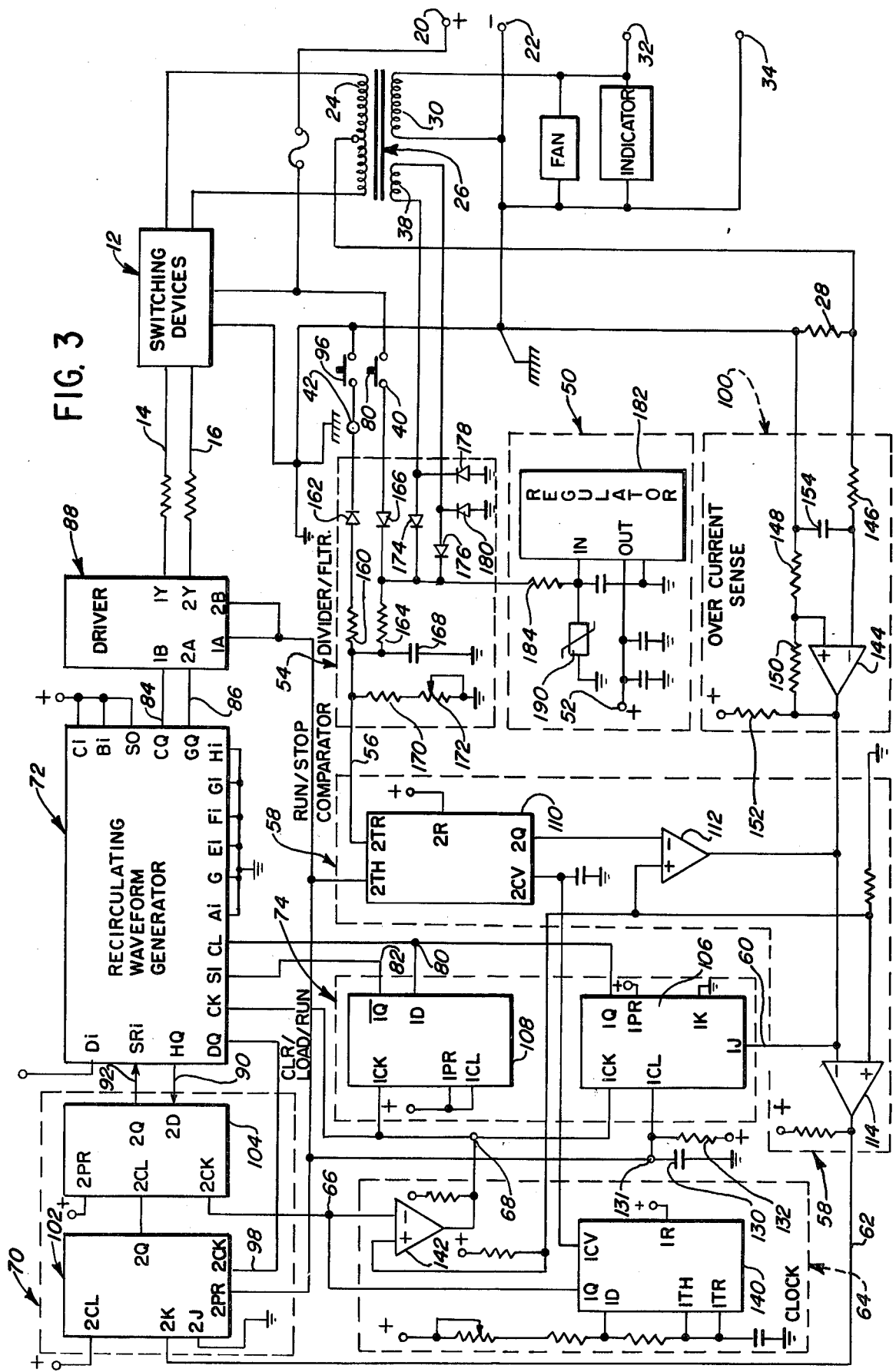

INVERTER CONTROL SYSTEM

BACKGROUND OF THE INVENTION

A. Field of the Invention

The present invention relates generally to the field of inverter and switching device control systems and more particularly to a control system that utilizes an internal reference source and supervisory control circuitry to accurately control the operation of a switching inverter.

B. Description of the Prior Art

Switching inverters of various types and intended for various applications are well known in the prior art. For example, one common type of switching inverter is utilized for the generation of 110VAC/60HZ from a direct current voltage source such as a vehicle battery for situations where such power sources are not readily available. Other inverters are utilized for polyphase output generation.

For example, an inverter wherein the switching devices are controlled by an integrated circuit is disclosed in U.S. Pat. No. 3,921,005 which issued to D. L. Watrous on Nov. 18, 1975. The control circuit includes various stages for detecting and controlling operating parameters. Thus, a start-stop logic stage, a zero crossing detector, an AC high voltage inhibiting stage, a low DC battery voltage inhibiting stage, and a current set stage are provided.

U.S. Pat. No. 3,769,569 which issued to B. Doemen on Oct. 30, 1973, describes a polyphase inverter circuit utilizing clock generated pulses and digital circuitry for generating control signals for the switching device of each output phase.

Other inverter control circuits are disclosed in U.S. Pat. Nos. 3,913,000 which issued to G. I. Cardwell, Jr. on Oct. 14, 1975; 3,930,193 which issued to W. P. Kornrumpf et al. on Dec. 30, 1975; and 3,848,176 which issued to M. Etter on Nov. 12, 1974. These inverter control circuits vary the pulse width of the drive signals to the switching devices. For example, in U.S. Pat. No. 3,913,000, the pulse width of the drive signal is varied to equalize current to the switching devices. U.S. Pat. No. 3,930,193 describes the constant width pulse control of an SCR and the variable width pulse control of a second device in series with the SCR as determined by sensing the output power or current. U.S. Pat. No. 3,848,176 describes a chopper circuit supplying pulses of variable width to produce a variable output voltage of variable frequency under the control of an oscillator stage and digital control circuitry.

Another type of inverter control circuit of the prior art utilizes PWM (pulse width modulation) techniques to produce a sine wave output by the filtering of successive pulses of varying widths. Control circuits of this type are disclosed in U.S. Pat. Nos: 3,916,285 which issued to M. Iwata et al. on Oct. 28, 1975; 3,875,496 which issued to B. W. Carsten on Apr. 1, 1975; and 3,649,902 which issued to R. A. Dunbar on Mar. 14, 1972. The control circuit described in U.S. Pat. No. 3,916,285 utilizes a plurality of triangular waveforms to control different zones of operation defined by voltage and frequence in accordance with an input command signal. In U.S. Pat. No. 3,875,496, a high frequency triangular wave is compared with a corrected reference sine wave. The output of the comparator controls the switching devices. An over-current detector and an over and under voltage detector are also described. U.S. Pat. No. 3,649,902 is directed to a clock driven digital logic control system including divider stages and shift registers to control the switching devices in a PWM pattern to produce a sine wave.

While the above described inverter control circuits of the prior art are generally suitable for their intended use, the prior art inverter control circuits do not provide a control system utilizing an internal reference source and associated control circuit to establish accurately controlled start up and shut down of the inverter and timed control of the switching devices to establish desirable active/inactive duty cycles of each.

SUMMARY OF THE INVENTION

Accordingly, it is an object of the present invention to provide an improved inverter control system which avoids one or more disadvantages of the prior art.

It is another object of the present invention to provide a control system for an inverter wherein an internal reference source and supervisory control circuitry are utilized to accurately control the start up and shut down of the inverter in a predetermined timed sequence and to control the active/inactive state of the switching devices in a predetermined timed sequence.

It is a further object of the present invention to provide a control system for an inverter wherein an accurate, predetermined duty cycle is established for each switching device; an inactive timed period being established between the active state of each switching device.

It is yet another object of the present invention to provide a control system for an inverter wherein an internal reference source and a supervisory control circuit establishes the accurate control of the switching devices in a predetermined timed relationship during operation and establishes an orderly start up and shut down of the inverter in accordance with predetermined timed occurrences.

In accordance with an important aspect of the present invention, there is provided a control system for a switching inverter including an internal reference source and supervisory control circuitry to determine accurate and orderly start up, shut down, control of the inverter switching elements and automatic shut down upon the occurrence of predetermined sensed conditions including low input voltage from the source and excessive current in the switching devices. The switching elements of the inverter are each controlled to produce respective outputs of predetermined active/inactive duty cycles each switching cycle with an accurate inactive period being established between the active periods of each switching element. Thus, induced transients due to inductive loads and the like are allowed to decay to safe levels prior to the switching transition between switching elements to reduce undesirable effects on the inverter circuitry and the switching elements.

In a specific embodiment, the internal reference source generates timing control pulses at a predetermined frequency and the supervisory control circuitry is responsive to the timing control pulses of the internal reference source and controls the operation of the switching devices. The supervisory control circuitry includes a control output stage for generating control signals to each of the switching devices that define the duty cycle operation of each of the switching devices in a predetermined active/inactive relationship for each of the switching devices and in a predetermined relationship between the switching devices, a stage for generating recirculating data signals related to the control signals in a predetermined manner, and a selective control stage that is responsive to predetermined sensed conditions of the inverter operation and to the recirculating data signals for selectively inhibiting the control signal generating stage.

The invention both as to its organization and method of operation together with further objects and advantages thereof will best be understood by reference to the following specification taken in conjunction with the accompanying drawings.

DESCRIPTION OF THE DRAWINGS

For a better understanding of the present invention, frequent reference will be made to the drawings wherein:

FIG. 3 is an electrical schematic diagram of the control system of the present invention;

DETAILED DESCRIPTION OF THE PREFERRED EMBODIMENT

Figure 1:
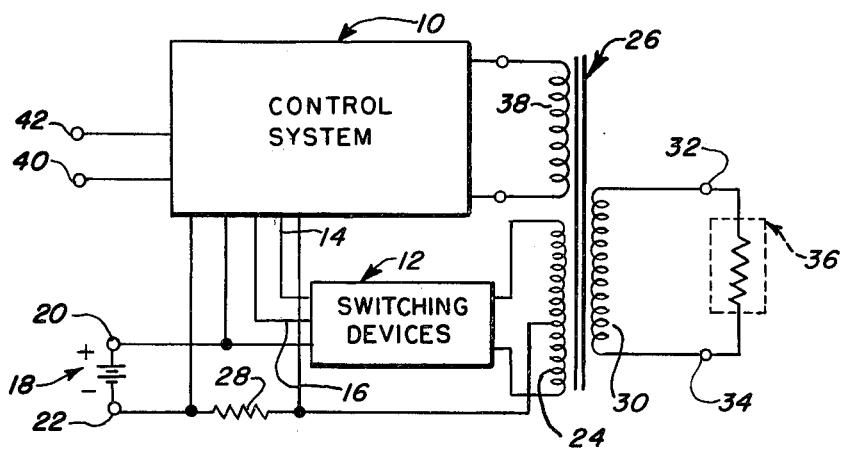
FIG. 1 is a block diagram and schematic representation of the inverter control system in accordance with the present invention.
Figure 2:
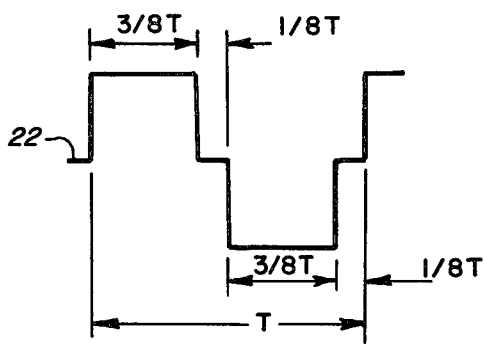
FIG. 2 is a diagrammatic representation of the output waveform generated by an inverter provided in the control system of the present invention.

Referring now to the drawings and more particularly to FIGS. 1 and 2, the control system of the present invention referred to generally at 10 is shown in operative connection to control a conventional inverter circuit of the type arranged to generate a 110 volt AC/60HZ output from a 12 volt DC input source. The control system 10 is connected to control the switching devices of the inverter referred to generally at 12 by two control signals 14 and 16. In a specific embodiment, there are two individual switching devices; each controlled by a respective one of the control signals 14, 16. The control system generates alternating control signals on the two lines 14 and 16 in a predetermined timed relationship. The control signals 14 and 16, in the specific embodiment where two switching devices are provided, are generated to alternately energize the switching devices at 12.

The DC input source referred to generally at 18 includes a positive supply terminal 20 connected to the control system 10 and the switching devices 12. The negative supply terminal 22 of the source 18 is connected to the control system 10 and to the center-tap point of a primary winding 24 of the inverter transformer 26 through a current sensing element or resistor 28. The junction of the center-tap of the primary winding 24 and the current sensing resistor 28 defines a current sensing point for the control system 10. The primary winding 24 of the transformer 26 is connected to the output of the switching devices 12. The inverter transformer 26 includes a secondary winding 30 providing the AC output voltage at output connections 32, 34 to a load referred to generally at 36. The inverter transformer 26 also includes an auxiliary or feedback winding 38 connected to the control system 10 for purposes of providing information to the control system 10 as to the operation of the inverter. The inverter transformer 26 is of conventional design for inverter applications and in specific embodiments comprises a saturable reactor, a toroid or an E-I shaped core transformer. The swtiching devices 12 comprise transistors or SCR's (silicon controlled rectifiers). It should be understood that while a specific inverter circuit and a transformer 26 are described, various other inverter configurations and voltage transforming devices are also contemplated.

Thus, the control system 10 controls the switching devices 12 in a predetermined manner; the transformer 26 at the secondary output 32, 34 providing power to the load 36 at a predetermined voltage and frequency characteristic at sufficient current capabilities to drive the specified load. The inverter illustrated in FIG. 1 provides a DC to AC conversion although the control system of the present invention is also applicable to inverters of the DC to DC type wherein the output at 32, 34 is rectified and filtered. Poly-phase inverter systems are also contemplated by the present invention.

The control system 10 and inverter circuitry of FIG. 1 provides the output wave shape illustrated in FIG. 2 having approximately the same R.M.S. and average value as a sine wave. Additionally, filtering or shaping of the output 32, 34 is provided where a sine wave output is required.

In accordance with important aspects of the present invention, the switching devices 12 are controlled by signals 14, 16 from the control system 10 to produce the output wave shape of FIG. 2 having a period T wherein an inactive time period, $\frac{1}{8}$ T in a specific embodiment, is provided and an active time period, $\frac{3}{8}$ T, for each switching device on alternate half cycles. Thus, an alternating current waveform is provided having positive and negative excursions or peak values about the ground potential 22 or other suitable reference point. An inactive time period is established between the active states of each switching cycle to provide accurate switching transistions and to allow induced transients to decay.

A start up control line 40 and a shut down control line 42 are provided to the control system 10 to control the operational state of the overall system and are connected to suitable control switches as will be described in detail hereinafter. The control system 10 is also capable of automatic shut down operations in response to predetermined sensed conditions.

Referring now to FIG. 3, the control system 10 includes a regulator stage 50 providing a 5 volt output at 52 to supply the various integrated circuit devices and discrete components of the control system 10. A divider/filter input stage 54 of the control system 10 is connected to the start up control line 40 through a control switch 80 and to the shut down control line 42 through a control switch 96. The divider/filter input stage 54 is also connected to the auxiliary winding 38. The divider/filter stage 54 converts the information on these inputs to a suitable signal for input to logic circuits at output 56. The output 56 is utilized by a run/stop comparator stage 58 of the control system 10 to produce a run signal output 60 and a stop signal output 62 in accordance with the input signal 56 and a predetermined output level of the regulator supply voltage 52.

The control system 10 also includes an internal reference source or clock stage 64 generating a first clock output 66 and an inverted clock output 68 of a predetermined frequency. The clock output 66 is connected to provide timing information to a carry-around stage 70 and the inverted clock output 68 is connected to a recirculating waveform generator stage 72 and to a clear, load and run stage 74. The output frequency of the clock stage 64 is a predetermined multiple of the output frequency at 32, 34. In a preferred embodiment, the clock frequency is equal to 480Hz, 8 times the output frequency of 60Hz. Correspondingly, the period of the clock outputs 66 and 68 is one eighth that of the output.

In operation and upon the closing of a momentary contact start up switch 80 connected between the start up control line 40 and the fused positive input supply terminal 20, the regulator stage 50 begins to supply a 5 volt output at 52 thus powering the circuitry of the control system 10. The run/stop comparator stage 58 generates a signal at the output 60 to the clear, load and run stage 74 after a predetermined time interval. This activity insures a preconditioning of the carry-around stage 70 and sets the clear, load, run stage 74 to the clear state. Upon the occurrence of the first clock signal 68 after the generation of the signal at 60 (negative or falling edge in a specific embodiment hereinafter described), the clear, load and run stage 74 produces a change in output stage (to a high logic level in the specific embodiment) at output 80 to the recirculating waveform generator stage 72. On the next successive, second, clock signal 68 (the positive or rising edge in the specific embodiment) the recirculating waveform generator 72 is conditioned to the load state. After a propagation time interval, the output 82 of the clear, load and run stage 74 changes output state (to a low logic level in the specific embodiment).

The recirculating waveform generator stage 72 controls a driver stage 88 over two output signal lines 84 and 86. In the load state and after a propagation time interval, the recirculating waveform generator stage 72 conditions the driver stage 88 to continue to output a high logic level on the switching device control line 16 and to output a low logic level on the control line 14 thus turning on or placing in an active state the switching device of 12 that is connected to line 14.

Thus, voltage appears across the secondary winding 30 and the auxiliary winding 38 and the divider/filter input stage 54 senses the output state to latch the control system 10 into an operational mode and continues to supply the control signal at 56 to the run/stop comparator 58 upon release of the start up switch 80.

On the next, third, clock signal (positive edge in the specific embodiment) the recirculating waveform generator 72 is conditioned to the run state. At this point in the specific embodiment, the output 16 is a high logic level and the output 14 is a low logic level. Thus far, the start up sequence to condition the recirculating waveform generator to the run state encompassed two clock periods.

With the recirculating waveform generator 72 in the run state, the clear, load and run state 74 no longer produces any output state changes at outputs 80, 82. Further, the recirculating waveform generator 72 is latched into the run state and the previously inputted data will shift to the right in a specific implementation upon each successive clock pulse at the clock input line 68 (positive edge). This clock pulse causes the output 84 to change to a low logic level while the output 86 remains at a low logic level. The recirculating waveform generator 72 in a specific embodiment is implemented by an 8-bit shift register.

The orderly start up sequence described hereinbefore results in a two clock period (FIG. 4) active duty cycle portion of the switching device controlled over line 14. In comparison, the normal active duty cycle portion during the operational mode is three clock periods. This assures a safe start up of the inverter.

Operational data from the recirculating waveform generator 72 is supplied at two outputs 90 and 92 to the carry-around stage 70. The carry-around stage 70 provides a return of the data on line 90 from the recirculating waveform generator 72 back to the recirculating waveform generator 72 on line 92 in the normal operation run mode. The carry-around stage 70 is controlled by the stop signal 62; the carry-around stage 70 disabling the carry-around function from line 90 to line 92 upon the detection of a stop signal 62 in accordance with the timing and interconnection of the stages.

A momentary contact, shut down switch 96 is connected between the ground potential 22 and the shut down control line 42 of the divider/filter input stage 54. Upon operation of the shut down switch 96, the output 56 of the divider input stage 54 changes state and the run/stop comparator stage 58 produces a stop signal at 62. The carry-around stage 70 also includes an input 98 from the recirculating waveform generator stage 72. When the carry-around stage 70 receives a stop signal 62 and a clock signal on input 98 from the recirculating waveform generator 72, the output 92 is changed to a low logic level state; the carry-around stage 70 at that time being inhibited from performing a carry-around function of the data received on line 90 from the recirculating waveform generator 72. The carry-around stage 70 remains latched in this state during the remainder of the shut down cycle.

Thus, after the shut down switch 96 is momentarily actuated, the output 86 of the recirculating waveform generator 72 is a high level for three clock pulses and then changes to a low level and at that point outputs 14, 16 of the driver stage 88 remain high thereafter. Thus, both power switching devices are in the inactive state and the entire inverter system is shut down.

The control system 10 further includes an overcurrent sensing stage 100 having inputs connected across the current sensing element 28, connected between the center tap of the primary winding 24 and the ground potential 22. Upon a predetermined voltage being detected across the sensing element 28, the overcurrent sensing stage 100 latches and produces a low level output state connected to the run signal 60; the low level output state preempting the run command generated by the run/stop comparator stage 58. With the activation of the stop signal 62, an automatic shut down sequence as described hereinbefore is initiated. The run/stop comparator 58 through divider/filter network 54 senses low source voltage and automatically initiates a shut down sequence in the same manner as described for overcurrent detection.

In a specific embodiment the stages are implemented as follows: the carry-around stage 70 by a JK flip-flop and a D flip-flop 104; the clear, load and run stage 74 by a JK flip-flop 106 and a D flip-flop 108; the run/stop comparator stage 58 by an astable device and two inverter gates.

Figure 4:
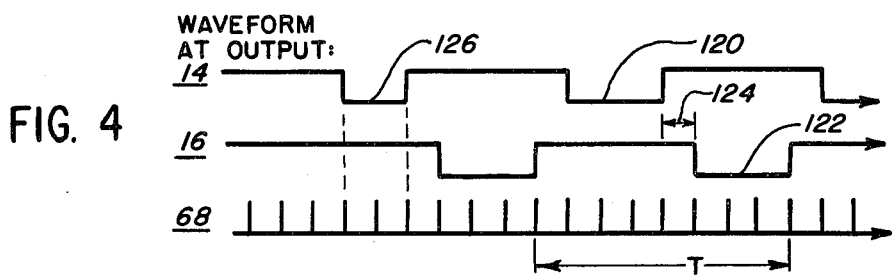
FIG. 4 is a diagrammatic representation of waveforms at various points in the control system of FIG. 3, illustrating the timed, predetermined start up sequence.
Figure 5:
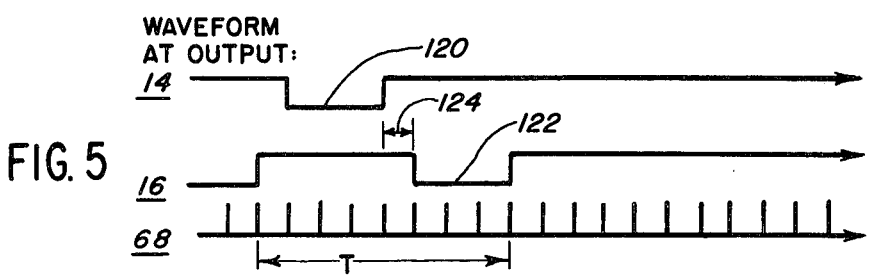
FIG. 5 is a diagrammatic representation of waveforms at various points in the control system of FIG. 3, illustrating the timed, predetermined shut down sequence.

Referring now to FIGS. 4 and 5, the start up, shut down and normal operational run sequences all occur at predetermined clock signal transistions (positive transistions illustrated) and the durations of the various signals are defined in terms of a predetermined number of clock pulse periods. Specifically, during the normal operational run modes, the active duty cycle portion 120 of the switching device controlled by line 14 is three clock pulse durations at the output 66 of the clock stage 64. The active duty cycle portions 122 of the switching device controlled by line 16 is also three clock periods. The clock pulses are illustrated as positive edge transistions for simplicity. Thus, for a total switching cycle of eight clock periods there is an inactive time period represented at 124 between the active duty cycle portion 120 of one switching device and the active duty cycle portion 122 of the other switching device. Further, in the start up sequence illustrated in FIG. 4, the first active duty cycle portion referred to at 126 of the switching device controlled on line 14 is two clock pulse durations.

Turning now to a more detailed discussion of a specific embodiment of FIG. 3, the run signal 60 is connected to the J input of the flip-flop 106 of the clear, load and run stage 74. The inverted clock signal 68 is connected to the clock inputs of the flip-flops 106 and 108. The K input of the flip-flop 106 is connected to ground potential 22 and the preset input of the flip-flop 106 is connected to the positive supply voltage line 52. The Q output of the flip-flop 106 is connected to the D input of the flip-flop 108 and to the clear input of the 8-bit shift register of the recirculating waveform generator stage 72. The preset clear inputs of the flip-flop 108 are both connected to the positive supply voltage 52. The $\overline{Q}$ output 82 is connected to the mode control input S1 of the 8-bit shift register 72. The clear input of the flip-flop 106 along with the preset input of the JK flip-flop 102 of the carry-around state 70 and the unused inputs of the driver stage 88 are connected at 131 to a timing circuit. The timing circuit includes a capacitor 130 connected between the junction 131 and ground potential, and a resistor 132 connected between the junction 131 and the supply voltage 52. The timing circuit at junction 131 supplies a time lagging voltage relative to the supply voltage 52 to clear the flip-flop 106, preset the flip-flop 102 and inhibits the unused inputs of the driver stage 88 during the start up sequence.

Considering the carry-around stage 70, the J input of the flip-flop 102 is connected to ground potential 22 and the clear input is connected to the positive supply 52. The K input of flip-flop 102 is connected to the stop signal 62 and the Q output is connected to the clear input of the D flip-flop 104 of the carry-around stage 70. The clock input of the flip-flop 102 is connected to the $Q_D$ output 98 of the 8-bit shift register 72. The clock input of the flip-flop 104 is connected to the output signal 66 of the clock stage 64. The preset input of the flip-flop 104 is connected to the positive supply voltage 52. The D input of the flip-flop 104 is connected by data line 90 to the $Q_H$ data output of the shift register 72 and the Q output of the flip-flop 104 is connected to the shift right serial input of the shift register 72 by the data line 92. The A, E, F, G, and H data inputs of the shift register 72 are connected to ground potential 22. The B, C and D data inputs and the $S_0$ input are connected to the positive supply voltage 52. The clock input of the shift register 72 is connected to the inverted clock output 68. The $Q_C$ data output 84 is connected to one input of the driver stage 88 and the $Q_G$ data output 86 is connected to the second input of the driver stage 88.

Considering the run/stop comparator stage 58, the astable device 110 (implemented by a timer) includes a trigger input connected to the output signal 56 of the divider/filter input stage 54 and a threshold input as previously discussed connected to the timing circuit comprising capacitor 130 and the resistor 132. The reset input of the astable stage 110 is connected to the positive supply voltage 52 and the Q output is connected to an inverter gate 112. The output of the gate 112 is connected to the run signal 60 and to the input of an inverter gate 114. The output of the inverter gate 114 generates the stop signal 62.

The clock stage 64 includes an astable device 140 (implemented by a timer) having a Q output connected to the clock output 66 and also through an inverter gate 142 to produce the inverted clock output 68.

The overcurrent sensing stage 100 includes a level comparator 114 with an output connected to the run signal line 60 and an inverting input connected through a series resistor 146 to the junction of the center tap of the primary winding 24 and the sensing element 28. The gate 112 and the level comparator stage 144 are thus connected to perform a logic OR function (wired logic OR). The non-inverting input of the level comparator stage 144 is connected to the junction of two resistors 148 and 150. The other end of the resistor 150 is connected to the output of the level comparator device 144 and through a series resistor 152 to the positive supply voltage 52. The other end of resistor 148 is connected to the other side of the sensing element 28 and through a capacitor 154 to the inverting input of the level comparator 144.

The divider/filter input state 54 includes the series combination of a resistor 160 and a diode 162 arranged anode to cathode connected between the output 59 and the shut down control line 42. The series combination of a resistor 164 and a diode 166 arranged cathode to anode is connected between the output 56 and the start up control line 40. A capacitor 168 is connected between the output 56 and ground potential. The series combination of a resistor 170 and a variable resistor 172 is connected between the output 56 and ground potential. Each end of the auxiliary winding 38 is connected through a respective diode 174, 176 arranged anode to cathode to the junction of resistor 164 and diode 166. Further, each side of the auxiliary windings 38 is connected to ground potential through a respective diode 178 and 180 arranged cathode to anode. The junction of diode 166 and resistor 164 is also connected to the input of the regulator device 182 of the regulator stage 50 through a series resistor 184. A zener diode 190 is also connected between the input of the regulator device 182 and ground potential 22.

In a specific embodiment, the following integrated circuit devices have been found suitable for use in implementing the various stages and logic devices of the control system 10:

| | Device No. | Manufacturer |
| --- | --- | --- |
| 72 | SN54198J | Texas Instruments |
| 102, 106 | SN54LS112J | Texas Instruments |
| 104, 108 | SN54LS74J | Texas Instruments |
| 110, 140 | SE556F | Signetics |
| 112, 114, 142, 144 | LM139J (Open Collector Outputs) | Signetics |
| 182 | LM109H | Signetics |

-continued

| Device No. | Manufacturer |
|---|---|
| 88 | SN55462JG | Texas Instruments |

The above examples have been given for illustrative purposes only and should not be interpreted in a limiting sense.

For example while a two phase control system is discussed in a preferred embodiment, it should also be understood that the present invention contemplates poly-phase inverter systems. For poly-phase inverter systems, the clock stage 140, the recirculating waveform generator 72, and the driver stage 88 are suitably modified. The frequency of the clock stage 64 for poly-phase operation is equal to four times the number of phase outputs.

Obviously many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. An inverter control system for use with a switching inverter of the type that produces an output having a first predetermined voltage and frequency characteristic from an input source having a second predetermined voltage and frequency characteristic, the switching inverter utilizing a voltage transforming device and power switching devices connected to the voltage transforming device, said inverter control system comprising:

first means for generating timing control pulses at a predetermined frequency; and means responsive to said timing control pulse generating means for controlling the operation of the switching devices of the inverter, said controlling means comprising, second means for generating control signals for each of the switching devices, said control signals defining the duty cycle operation of each of the switching devices in a predetermined active/inactive relationship for each of the switching devices and in a predetermined relationship between the switching devices, third means for generating recirculating data signals related to said control signals in a predetermined manner, and means responsive to predetermined sensed conditions of the inverter operation and to said third recirculating data signal generating means for selectively inhibiting said second control signal generating means.

2. An inverter control system as recited in claim 1 wherein said controlling means further comprises fourth means for generating a predetermined start up sequence and a predetermined shut down sequence of the inverter switching devices.

3. An inverter control system as recited in claim 2 wherein said predetermined start up sequence and said predetermined shut down sequence is generated in accordance with said timing control pulses.

4. An inverter control system as recited in claim 1 further comprising a sensing element arranged in the inverter to sense switching device current and input source voltage, and means for initiating an automatic shut down sequence upon occurrence of a predetermined high switching device current or low input source voltage.

5. An inverter control system as recited in claim 4 wherein said automatic shut down initiating means is connected to said controlling means to inhibit said second control signal generating means.

6. An inverter control system as recited in claim 1 wherein said predetermined active/inactive relationship in said duty cycle for each of said switching devices is defined in terms of a first predetermined number of timing control pulses for the active portion of the duty cycle equal to at least one timing control pulse and a second predetermined number of timing control pulses for the inactive portion of the duty cycle equal to at least one timing control pulse.

7. An inverter control system as recited in claim 6 wherein said first and second predetermined numbers of timing control pulses are equal for each of the inverter switching devices.

8. An inverter control system as recited in claim 6 wherein said control signals for each of the inverter switching devices is mutually exclusive and generated in alternating fashion.

9. An inverter control system as recited in claim 6 wherein the control signal for each inverter switching device is separated in time by a third predetermined number of timing control pulses with respect to the control signals for any of the other inverter switching devices immediately preceding or following in time.

10. An inverter control system as recited in claim 6 wherein said predetermined frequency of said timing control pulse generating means is equal to a predetermined multiple of the output frequency.

11. An inverter control system as recited in claim 10 wherein said predetermined multiple is equal to the sum of said first and second predetermined numbers of timing control pulses in said defined duty cycle.

12. An inverter control system as recited in claim 11 wherein said predetermined multiple is equal to 8.

13. An inverter control system as recited in claim 1 wherein said second and third generating means comprise a shift register.

14. An inverter control system as recited in claim 13 wherein said selective inhibiting means comprises two bistable logic circuits, a first bistable logic circuit being connected to receive said recirculating data signals from said shift register and transmit said recirculating data signals back to said shift register, said second bistable logic circuit connected to control said first bistable logic circuit to inhibit said recirculating data signals.

15. An inverter control system as recited in claim 11 wherein said predetermined multiple is equal to four times the number of phase outputs.

* * * * *